(12) United States Patent
George et al.

(10) Patent No.: US 12,162,356 B2
(45) Date of Patent: Dec. 10, 2024

(54) VEHICLE DRIVETRAIN

(71) Applicant: McLaren Automotive Limited, Woking (GB)

(72) Inventors: Sunoj Cherian George, Woking (GB); Stephen Johanson, Woking (GB); Stephen Carey, Woking (GB)

(73) Assignee: MCLAREN AUTOMOTIVE LIMITED, Woking (GB)

( * ) Notice: Subject to any disclaimer, the term of this patent is extended or adjusted under 35 U.S.C. 154(b) by 0 days.

(21) Appl. No.: 17/743,043

(22) Filed: May 12, 2022

(65) Prior Publication Data

US 2022/0363123 A1   Nov. 17, 2022

(30) Foreign Application Priority Data

May 14, 2021 (GB) ..................................... 2106954

(51) Int. Cl.
*B60K 6/26* (2007.10)
*B60K 6/24* (2007.10)
*B60K 6/38* (2007.10)
*B60K 6/52* (2007.10)

(52) U.S. Cl.
CPC .................. *B60K 6/26* (2013.01); *B60K 6/24* (2013.01); *B60K 6/38* (2013.01); *B60K 6/52* (2013.01)

(58) Field of Classification Search
CPC ... B60K 6/26; B60K 6/24; B60K 6/38; B60K 6/52
See application file for complete search history.

(56) References Cited

U.S. PATENT DOCUMENTS

2008/0116759 A1* 5/2008 Lin ....................... H02P 25/188
310/156.01
2010/0193269 A1 8/2010 Fuchtner et al.
(Continued)

FOREIGN PATENT DOCUMENTS

CN 201951225 U 8/2011
DE 102017206618 A1 10/2018
(Continued)

OTHER PUBLICATIONS

GB Application No. 2106954.7, GB Search Report Under 17(5), mailed Nov. 8, 2021, 4 pages.
(Continued)

*Primary Examiner* — Charles A Fox
*Assistant Examiner* — Gregory T Prather
(74) *Attorney, Agent, or Firm* — Kilpatrick Townsend & Stockton LLP

(57) ABSTRACT

A vehicle comprising: first and second front electric motors, each front electric motor being coupled to a respective front wheel to drive that front wheel; a rear electric motor, an internal combustion engine, the internal combustion engine and rear electric motor being coupled to a rear axle to drive rear wheels; and three motor control units each comprising drive components, each motor control unit being coupled to a respective electric motor to drive that electric motor using the drive components, and the front and rear electric motors having a common set of physical characteristics so that each of the motor control units has identical drive components.

18 Claims, 1 Drawing Sheet

(56) References Cited

U.S. PATENT DOCUMENTS

| | | | |
|---|---|---|---|
| 2013/0261862 A1* | 10/2013 | Nishimori | B60W 10/119 |
| | | | 701/1 |
| 2015/0224866 A1* | 8/2015 | Parenti | B60K 6/365 |
| | | | 903/910 |
| 2018/0257651 A1 | 9/2018 | Kitagawa | |
| 2021/0016765 A1* | 1/2021 | Toda | B60L 9/18 |

FOREIGN PATENT DOCUMENTS

| | | |
|---|---|---|
| EP | 2784914 A1 | 12/2017 |
| EP | 3753797 A1 | 12/2020 |
| JP | 2011031744 A | 2/2011 |
| JP | 2020090172 A | 6/2020 |
| WO | 2006097818 A1 | 9/2006 |

OTHER PUBLICATIONS

EP Application No. EP 22173382.7, "Extended European Search Report", Oct. 12, 2022, 8 pages.
"Communication pursuant to Article 94 (3) EPC", issued by the European Patent Office on Jul. 22, 2024 for counterpart application No. 22173382.7, 4 pages.

\* cited by examiner

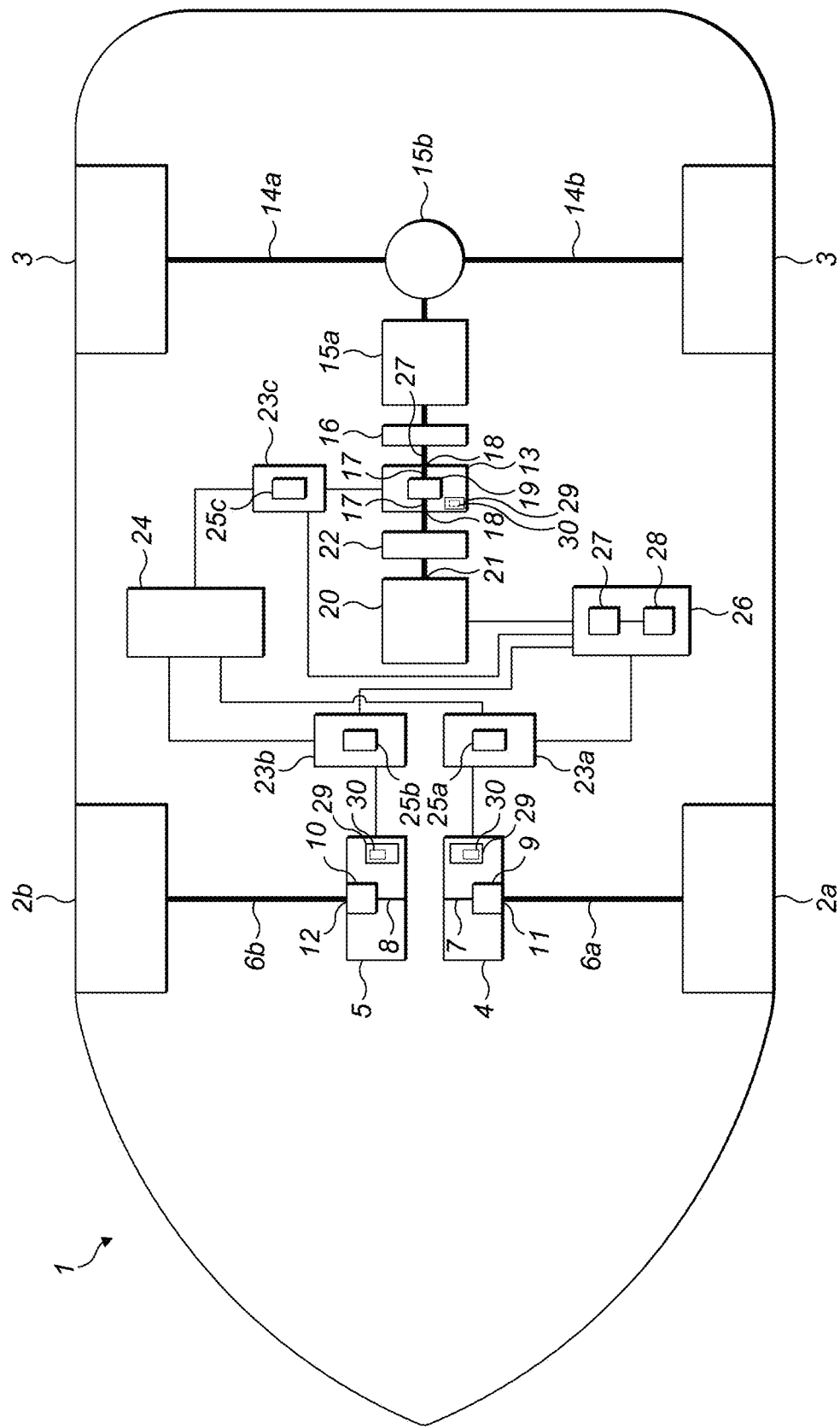

VEHICLE DRIVETRAIN

CROSS-REFERENCE TO PRIORITY APPLICATIONS

This application claims priority to GB Patent Application No. 2106954.7, titled "Vehicle Drivetrain," filed May 14, 2021, the entirety of which is incorporated by reference herein.

This invention relates to a vehicle comprising first and second front electric motors, a rear electric motor, an internal combustion engine and three motor control units.

A typical road vehicle has at least one source of drive. It is becoming increasingly common for vehicles to have multiple sources of drive such as an internal combustion engine working in conjunction with at least one electric motor. Some vehicles may have electric motors to drive their front wheels and a combination of an internal combustion engine and at least one electric motor to drive the rear wheels.

Having multiple sources of drive can increase the costs associated with the production of the vehicle due to the additional components required and the added complexity in controlling the various drive systems.

It would therefore be desirable for there to be an improved drivetrain for a vehicle.

According to a first aspect of the present invention there is provided a vehicle comprising: first and second front electric motors, each front electric motor being coupled to a respective front wheel to drive that front wheel; a rear electric motor; an internal combustion engine, the internal combustion engine and rear electric motor being coupled to a rear axle to drive rear wheels; and three motor control units each comprising drive components, each motor control unit being coupled to a respective electric motor to drive that electric motor using the drive components, and the front and rear electric motors having a common set of physical characteristics so that each of the motor control units has identical drive components.

Each front electric motor may be coupled to the respective front wheel without a disengagement mechanism from driving the front wheel. The vehicle may have a maximum speed, and each front electric motor may be configured to provide drive to the respective front wheel up to the maximum speed of the vehicle. The vehicle may have a maximum speed, and the rear electric motor may be configured to provide drive to the rear axle up to the maximum speed of the vehicle.

The internal combustion engine may be releasably coupled to the rear electric motor. The rear electric motor may be releasably coupled to the rear axle. The internal combustion engine and rear electric motor may have common rotational speed ranges. The internal combustion engine may be limited to a maximum rotational speed, the internal combustion engine and rear electric motor may be both coupled to a rear drive shaft, and the motor control unit coupled to the rear electric motor may be configured to drive the rear electric motor to cause the rear drive shaft to reach the maximum rotational speed.

Each motor control unit may be formed from identical hardware, the drive components may form part of the hardware of the respective motor control unit. The common set of physical characteristics may mean that the electric motors are mutually interchangeable. The electric motors may each comprise at least one coil composed of a number of windings, the at least one coil driving the respective electric motor, the front electric motors may be identical in physical characteristics, and the rear electric motor may differ from the front electric motors only in the number of windings of the at least one coil.

The present invention will now be described by way of example with reference to the accompanying drawings. In the drawings:

FIG. 1 shows a schematic plan of a drivetrain of a vehicle.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a vehicle comprising first and second front electric motors, each front electric motor being coupled to a respective front wheel to drive that front wheel, and a rear electric motor. The vehicle further comprises an internal combustion engine, the internal combustion engine and rear electric motor being coupled to a rear axle to drive rear wheels. The vehicle further comprises three motor control units each comprising drive components, each motor control unit being coupled to a respective electric motor to drive that electric motor using the drive components, and the front and rear electric motors having a common set of physical characteristics so that each of the motor control units has identical drive components.

FIG. 1 shows a vehicle 1. The vehicle 1 may be an automobile. The vehicle may be a car. The vehicle 1 comprises front wheels 2 and rear wheels 3. The front of the vehicle is defined with reference to the primary motion direction of the vehicle 1. The front of the vehicle 1 points in the primary motion direction of the vehicle. Generally, a vehicle has a primary motion direction that is the forward direction.

The vehicle 1 comprises first and second front electric motors 4, 5. The first and second front electric motors 4, 5 are drive motors. The first front electric motor 4 is coupled to first front wheel 2a. The first front electric motor 4 can therefore drive first front wheel 2a. The second front electric motor 5 is coupled to second front wheel 2b. The second front electric motor 5 can therefore drive second front wheel 2b. The front electric motors 4, 5 are coupled to respective half-shafts 6a and 6b. The first front wheel 2a is coupled to a first half-shaft 6a so that the first front electric motor 4 can drive the first front wheel 2a. The second front wheel 2b is coupled to a second half-shaft 6b so that the second front electric motor 5 can drive the second front wheel 2b.

The front electric motors 4, 5 comprise respective drive shafts 7, 8. The drive shaft 11, 12 is caused to rotate in response to electrical input being provided to the electric motor 4, 5. The front electric motors 4, 5 each comprise an output shaft 11, 12. The drive shafts may be directly coupled to their respective half-shafts 6. In this case, the drive shaft is also the output shaft of the electric motor and the half-shaft 6 is coupled to the output shaft 11, 12. Alternatively, front electric motors may be connected to a gearing 9, 10 between the drive shaft and the output shaft 11, 12. The gearing 9, 10 changes the rotational speed of the drive shaft relative to the output shaft. Again, the half-shaft 6 is coupled to the output shaft 11, 12 of the electric motor.

The front electric motors 4, 5 may be coupled to their respective front wheel 2 without a disengagement mechanism from driving their respective front wheel. No disengagement mechanism may be present in the drive path between the front electric motor and the front wheel. The disengagement mechanism may be a clutch. Therefore, no clutch may be present in the drive path between the front electric motor and the front wheel. The front electric motor 4, 5 may be continuously connected to the respective front wheel. It will be understood that the front electric motors may be disconnected from their respective front wheel during maintenance of the vehicle by detaching the mechanical connection between the front electric motor and the respective wheel. However, when the vehicle is capable of being used for normal use each front electric motor 4, 5 cannot be disengaged from driving its respective front wheel 2.

The vehicle 1 comprises a rear electric motor 13. The rear electric motor 13 is a drive motor. The rear electric motor 13 is coupled to a rear axle 14 to drive rear wheels 3. The rear electric motor 13 is coupled to the rear axle 14 by a transmission 15. The transmission 15 may comprise a gearbox 15a and a differential 15b. The gearbox 15a permits the rear electric motor 13 to drive the rear axle 14 at a plurality of gear ratios. Thus, for a given rotational speed of the rear electric motor 13, the rear axle 14 can be driven at a plurality of different rotational speeds as defined by the plurality of gear ratios. The differential 15b is coupled to the gearbox 15a to permit drive to be delivered to each of the rear wheels 3. A pair of half shafts 14a, 14b of the rear axle 14 may be coupled to a respective rear wheel 3 to deliver drive to that rear wheel 3.

The rear electric motor 13 is shown as being releasably coupled to the transmission 15. The releasable connection between rear electric motor 13 may be provided by one or more clutches 16. The gearbox 15a may be a dual-rail gearbox 15a and so require a dual-clutch 16 as the input to the gearbox 15a.

The rear electric motor 13 comprises a drive shaft 17. The drive shaft 17 is caused to rotate in response to electrical input being provided to the rear electric motor 13. The rear electric motor 13 comprises an output shaft 18. The drive shaft 17 may be directly coupled to neighbouring components for delivery of drive to the rear axle 14. In this case, the drive shaft 17 is also the output shaft 18 of the electric motor 13. Alternatively, rear electric motor may be connected to a gearing 19 between the drive shaft 17 and the output shaft 18. The gearing 19 changes the rotational speed of the drive shaft relative to the output shaft. The output shaft is coupled to neighbouring components for delivery of drive to the rear axle 14. In the example shown in FIG. 1, the output shaft of the rear electric motor 13 is coupled to the transmission 15.

The vehicle 1 comprises an internal combustion engine 20. The internal combustion engine 20 comprises a drive shaft 21. The internal combustion engine 20 is configured to cause the drive shaft 21 to rotate about its axial direction. The internal combustion engine 20 is coupled to rear axle 14. The internal combustion engine 20 is coupled to rear electric motor 13. The internal combustion engine 20 is shown as being releasably coupled to rear electric motor 13. The releasable connection between the internal combustion engine 20 and the rear electric motor 13 may be provided by a clutch 22. The rear electric motor 13 may be an inline electric motor as shown in FIG. 1 where the output shaft is capable of connection from both sides. In this case the internal combustion engine 20 is coupled to one side of the rear electric motor 13, and thus the output shaft 18, and the transmission 15 is coupled to the other side of the rear electric motor 13, and thus the output shaft 18. The rear electric motor 13 may alternatively be coupled to the internal combustion engine 20 and the rear axle 14 by a gearbox. This may be gearing 19 or an additional gearbox. In this way, both the internal combustion engine 20 and the rear electric motor 13 are coupled to the rear axle to drive the rear wheels.

The vehicle 1 comprises a motor control unit 23 for each of the front electric motors 4, 5. Thus, the vehicle 1 comprises three motor control units 23. A first motor control unit 23a is coupled to the first front electric motor 4. A second motor control unit 23b is coupled to the second front electric motor 5. A third motor control unit 23c is coupled to the rear electric motor 13. The vehicle 1 comprises a battery system 24. The battery system 24 comprises one or more batteries. The motor control units 23 are connected to the battery system 24 to draw electrical energy from the battery system 24 to power their respective electric motor. The motor control units 23 may also return electrical energy to the battery system 24 when the electric motors are acting as generators.

The motor control unit 23 comprises hardware 25. The hardware 25 being the physical components of the motor control unit 23 which permit the motor control unit 23 to undertake its functions. The hardware 25 comprises drive components of the motor control unit 23. The drive components are used by the motor control unit 23 to drive the respective electric motor to which that motor control unit 23 is connected. The drive components provide electrical energy to the electric motor to drive the electric motor. By driving the electric motor, the drive shaft of the electric motor is caused to rotate. Other hardware may include other physical components of the motor control unit such as connectors for the motor control unit, sensors, and displays which interact with the drive components.

The hardware 24 of the motor control unit 23 is controlled by software code stored in a memory which forms part of hardware 25. The software code may be stored in a non-transitory form. The software code is executed by the hardware 25, for instance, by a processor comprised within the hardware 24.

The electric motors may be three-phase electric motors. The electric motors may be AC electric motors. The battery system 24 may output electrical energy in the form of DC electricity. Therefore, the motor control units 23 may convert the electrical energy output from the battery system to a form that can be used to power the electric motors. The motor control units may be DC/AC converters. The motor control unit 23 may convert DC to three-phase AC.

The operation of the vehicle is regulated by a Vehicle Control Unit (VCU) 26. The VCU 26 comprises a processor 27 and a non-volatile memory 28. The VCU 26 may comprise more than one processor 27 and more than one memory 28. The memory 28 stores a set of program instructions that are executable by the processor, and reference data such as look-up tables that can be referenced by the processor in response to those instructions. The processor 27 may be configured to operate in accordance with a computer program stored in non-transitory form on a machine readable storage medium. The computer program may store instructions for causing the processor to perform the operations of the VCU 26 in the manner described herein. The VCU 26 may be formed of a number of control units, such an Engine Control Unit, Power Source Control Unit, Gearbox Control Unit, and/or Dynamics Control Unit.

The VCU 26 is coupled to a throttle pedal to receive the detected position of the throttle pedal 34. The VCU 26 is coupled to the motor control units 23 and the internal combustion engine 20 to receive from them data relating to the operation of the motor control units 23, the electric motors 4, 5, 13 and the internal combustion engine 20. For instance, the current RPM of the power sources, operating temperature and/or operating parameters. The VCU 26 also transmits to the motor control units 23 and internal combustion engine 20 control information that regulates the operation of the motor control units 23, the electric motors 4, 5, 13 and the internal combustion engine 20. That control information could, for example, include the amount of fuel and/or air to be charged in each inlet stroke, valve and ignition timings, turbo boost level, output power level, and other data relating to the control of an electric motor.

The VCU 26 is also coupled to first clutch(es) 16 and second clutch 22 to control the connection between the internal combustion engine 20, rear electric motor 13 and rear drive axle 14.

The program instructions stored by the memory define a mechanism whereby the VCU 26 can determine a set of output parameters for controlling the motor control units 23 and the internal combustion engine 20. In this way, the rotational speed of the electric motors 4, 5, 13 and the internal combustion engine 20 can be controlled. This in turn controls the torque generated by each electric motor 4, 5, 13 and the internal combustion engine 20 at any given moment. The output values may be updated frequently: typically 20 or more times per second to generate a series of output values reflecting up-to-date input values.

Each electric motor 4, 5, 13 may comprise one or more of the following components:
A drive shaft.
A rotor. The rotor being caused to rotate by electrical energy being supplied to the electric motor. The rotor being coupled to the drive shaft of the electric motor to cause the drive shaft to rotate.
Magnets associated with the rotor. The magnets interacting with a magnetic field generate by electrical energy being supplied to the electric motor.
A stator. The stator generating a magnetic field in response to electrical energy being supplied to the electric motor.
One or more coils 29. The coils 29 being formed from wire. Each coil 29 being composed of a number of windings 30. The coils 29 are wound in the stator to generate the magnetic field.
Mountings to connect the electric motor to other components.
An interface between the drive shaft and the output shaft.

The components that the electric motor comprises and how those components are configured form a set of physical characteristics of the electric motor.

To simplify the drive configuration of the vehicle, the front and rear electric motors 4, 5, 13 have a common set of physical characteristics. This common set of physical characteristics may permit the electric motors 4, 5, 13 to be mutually interchangeable as they operate in the same manner. This common set of physical characteristics may permit the electric motors 4, 5, 13 to be mutually interchangeable as they have physical components that are the same which means that they can be controlled in the same manner. The common set of physical characteristics mean that the motor control units 25 can control each of the each of the electric motors in the same way. This means that the motor control units 25 can have identical hardware. This is because each electric motor is controlled in the same manner. The motor control units 25 may have identical drive components. The motor control units 25 may each have the same physical components that form the drive control of the motor control unit 25. The motor control unit 25 may be identical in so far as the features affect the operation of the motor control unit 25. For instance, the motor control unit 25 may each have a different surface colour on the housing of the motor control unit but functionally the motor control units all operate in the same manner with the same components.

The front and rear electric motors 4, 5, 13 may be all of the same type. The electric motors may all be the same model of electric motor. This means that the front and rear electric motors 4, 5, 13 share common inputs and methods of control. Means that the same configuration of motor control unit 25 can be used to operate each of the electric motors 4, 5, 13.

As discussed herein a VCU 26 may control the rotational speed of the electric motors and the internal combustion engine. The rotational speed being the speed at which the respective drive shaft of the power source rotates about its axial direction. The internal combustion engine 20 is limited to a maximum rotational speed. This is the maximum speed at which it can operate without risk of damage. The VCU 26 may limit the rotational speed of the internal combustion engine 20 to not exceed the maximum rotational speed. This may be known as a rev-limiter. The maximum rotational speed may be 8000 rpm, 8500 rpm, 9000 rpm, 9500 rpm or 10000 rpm. It will be appreciated that the maximum rotational speed will depend on the configuration of the internal combustion engine.

The vehicle 1 has a maximum speed. This maximum speed may be defined by the torque generated by the electric motors 4, 5, 13 and the torque generated by the internal combustion engine at or approaching the maximum rotational speed of the internal combustion engine in dependence on the aerodynamic properties of the vehicle 1. The maximum speed of the vehicle 1 may be electronically limited to a predefined maximum speed. This may be a speed below a threshold speed at which the vehicle 1 becomes unstable. The maximum speed may be limited by the VCU 26. The maximum speed may be defined by the final drive gearing of the powertrain from the internal combustion engine 20 to the rear wheels 3 when the transmission is in its highest gear ratio and dependent on the wheel size when the internal combustion engine is running at its maximum rotational speed.

The physical characteristics of the rear electric motor are selected so that the rear electric motor 13 is capable of driving the output shaft of the rear electric motor 13 at the maximum rotational speed of the internal combustion engine 20. This permits the rear electric motor 13 to provide torque to the rear axle 14 at all rotational speeds of the internal combustion engine. The internal combustion engine 20 and the rear electric motor 13 are both coupled to a rear drive shaft 27 which is coupled to the clutch(es) 16 and transmission 15. Thus, the rear electric motor 13 is configured to drive the rear drive shaft up to the maximum rotational speed of the internal combustion engine 20. Where the rear electric motor 13 is connected to gearing 19, the gearing 19 may be configured to enable the rear electric motor 13 to drive the rear drive shaft up to the maximum rotational speed. The rear electric motor 13 has a maximum rotational speed and the gearing is configured so that the maximum rotational speed of the rear electric motor 13 is not exceeded. In this way, the rear electric motor 13 is configured to provide drive to the rear axle up to the maximum speed of the vehicle 1.

The physical characteristics of the front electric motors 4, 5 are selected so that the front electric motors 4, 5 are capable of providing drive to the front wheels up to the maximum speed of the vehicle 1. This permits the front electric motors 4, 5 to provide torque to the front wheels 2 at all vehicle speeds up to the maximum speed of the vehicle 1. Where the front electric motor is connected to gearing 19, the gearing 19 may be configured to enable the front electric motors 4, 5 to drive the front wheels up to the maximum speed of the vehicle 1. The front electric motors 4, 5 have a maximum rotational speed and the gearing is configured so that the maximum rotational speed of the front electric motors 4, 5 is not exceeded. In this way, the front electric motors 4, 5 are configured to provide drive to the front wheels (2*a-b*) up to the maximum speed of the vehicle 1.

The gear ratio of the gearing of the front electric motors 4, 5 and the rear electric motor 13 may be the same.

The torque requirements of the front electric motors may be different to the rear electric motor. This is because the rear electric motor can drive the rear axle in conjunction with the internal combustion engine. Therefore, the front electric motors 4, 5 may be configured to produce a different torque profile over rotational speed compared to the rear electric motor 13. Thus, the front electric motors 4, 5 may have a different number of windings 30 for each coil 29 to the number of windings 30 for each coil 29 in the rear electric motor 13. The front electric motors 4, 5 may have an identical set of physical characteristics. The front electric motors 4, 5 may be identical in physical characteristics. The physical characteristics of the rear electric motor 13 may only differ from the physical characteristics of the front electric motors 4, 5 in the number of windings 30 for each coil 29.

The identical or very close nature of the front electric motors 4, 5 compared with the rear electric motor 13 permits the motor control units to each be the same with the only difference being embodied in the software running on the motor control units 23. The front motor control units 23*a*, 23*b* may comprise a different control map compared to the rear motor control unit 23*c*. The control map defining how the motor control unit drives the respective electric motor to achieve a particular torque demand. This is advantageous as it simplifies the components that are needed to provide a four wheel drive hybrid vehicle with front and rear electric motors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle comprising:
    first and second front electric motors, each front electric motor being coupled to a respective front wheel to drive that front wheel, each front electric motor having a first maximum rotational speed;
    a rear electric motor, the rear electric motor having a second maximum rotational speed;
    an internal combustion engine, the internal combustion engine and rear electric motor being coupled to a rear axle to drive rear wheels; and
    three motor control units, each motor control unit being coupled to a respective electric motor to drive that electric motor, and wherein each motor control unit comprises a housing and motor drive components disposed within the housing, each motor control unit comprises the same motor drive components to drive its respective motor, and wherein each electric motor includes and uses the same components to drive its respective output shaft;
    wherein the vehicle has a maximum speed, wherein the maximum speed of the vehicle is the lowest of an electronically limited speed, a redline limited speed, or a drag limited speed;
    wherein each front electric motor is configured to provide drive to the respective front wheel at all vehicle speeds up to the maximum speed of the vehicle so that the first maximum rotational speed of the front electric motors is not exceeded at the maximum speed of the vehicle; and
    wherein the rear electric motor is configured to provide drive to the rear axle at all vehicle speeds up to the maximum speed of the vehicle so that the second maximum rotational speed of the rear electric motor is not exceeded at the maximum speed of the vehicle.

2. A vehicle according to claim 1, wherein each front electric motor is coupled to the respective front wheel without a disengagement mechanism from driving the front wheel.

3. A vehicle according to claim 1, wherein the internal combustion engine is releasably coupled to the rear electric motor.

4. A vehicle according to claim 3, wherein the rear electric motor is releasably coupled to the rear axle.

5. A vehicle according to claim 1, wherein the rear electric motor is releasably coupled to the rear axle.

6. A vehicle according to claim 1, wherein the internal combustion engine and rear electric motor have common rotational speed ranges.

7. A vehicle according to claim 6, wherein the internal combustion engine is limited to a third maximum rotational speed, the internal combustion engine and rear electric motor are both coupled to a rear drive shaft, and the motor control unit coupled to the rear electric motor is configured to drive the rear electric motor to cause the rear drive shaft to reach the third maximum rotational speed.

8. A vehicle according to claim 1, wherein the internal combustion engine is limited to a third maximum rotational speed, the internal combustion engine and rear electric motor are both coupled to a rear drive shaft, and the motor control unit coupled to the rear electric motor is configured to drive the rear electric motor to cause the rear drive shaft to reach the third maximum rotational speed.

9. A vehicle according to claim 1, wherein each motor control unit is formed from identical hardware, the physical components forming part of the hardware of the respective motor control unit.

10. A vehicle according to claim 9, wherein the electric motors are mutually interchangeable.

11. A vehicle according to claim 10, wherein the electric motors each comprise at least one coil composed of a number of windings, the at least one coil driving the respective electric motor, the front electric motors are identical in physical characteristics, and the rear electric motor differs from the front electric motors only in the number of windings of the at least one coil.

12. A vehicle according to claim 9, wherein the electric motors each comprise at least one coil composed of a number of windings, the at least one coil driving the respective electric motor, the front electric motors are identical in physical characteristics, and the rear electric motor differs from the front electric motors only in the number of windings of the at least one coil.

13. A vehicle according to claim 1, wherein the electric motors are mutually interchangeable.

14. A vehicle according to claim 13, wherein the electric motors each comprise at least one coil composed of a number of windings, the at least one coil driving the respective electric motor, the front electric motors are identical in physical characteristics, and the rear electric motor differs from the front electric motors only in the number of windings of the at least one coil.

15. A vehicle according to claim 1, wherein the electric motors each comprise at least one coil composed of a number of windings, the at least one coil driving the respective electric motor, the front electric motors are identical in physical characteristics, and the rear electric motor differs from the front electric motors only in the number of windings of the at least one coil.

16. A vehicle according to claim 1, wherein the rear electric motor is configured to provide drive to the rear axle up to the maximum speed of the vehicle.

17. A vehicle according to claim 16, wherein the internal combustion engine and rear electric motor have common rotational speed ranges.

18. A vehicle comprising:
first and second front electric motors, each front electric motor being coupled to a respective front wheel to drive that front wheel;
a rear electric motor;
an internal combustion engine, the internal combustion engine and rear electric motor being coupled to a rear axle to drive rear wheels; and
three motor control units, each motor control unit being coupled to a respective electric motor to drive that electric motor, and wherein each motor control unit comprises a housing and motor drive components disposed within the housing, each motor control unit comprises the same motor drive components to drive its respective motor, and wherein each electric motor includes and uses the same components to drive its respective output shaft; and
wherein the electric motors each comprise at least one or more coils composed of a number of windings, the front electric motors are identical in physical characteristics, and the rear electric motor differs from the front electric motors only in the number of windings of the one or more coils.

* * * * *